United States Patent [19]

Rey

[11] 4,391,150
[45] Jul. 5, 1983

[54] ELECTRO-ACOUSTIC FLOWMETER

[76] Inventor: Thomas J. Rey, 319 Nashua Rd., Bedford, Mass. 01730

[21] Appl. No.: 216,667

[22] Filed: Dec. 15, 1980

[51] Int. Cl.$^3$ .............................................. G01F 1/66
[52] U.S. Cl. .................................................. 73/861.29
[58] Field of Search ............ 73/861.27, 861.28, 861.29

[56] References Cited

U.S. PATENT DOCUMENTS

| | | | |
|---|---|---|---|
| 3,314,289 | 4/1967 | Rodely | 73/861.34 |
| 3,473,378 | 10/1969 | Yoshiyama et al. | 73/861.29 |
| 3,537,309 | 11/1970 | Geohegan, Jr. et al. | 73/861.29 |
| 3,575,049 | 4/1971 | Boland | 73/861.29 |
| 3,641,817 | 2/1972 | Dory | 73/861.29 |
| 3,987,674 | 10/1976 | Baumoel | 73/861.28 |
| 4,015,470 | 4/1971 | Morrison | 73/861.03 |

OTHER PUBLICATIONS

Lynnworth–"Clamp-On Ultrasonic Flowmeters . . . Limitations and Remedies", Instrument Technology, vol. 22, No. 9, pp. 37–44, Sep. 1975.

*Primary Examiner*—Charles A. Ruehl
*Attorney, Agent, or Firm*—Maurice R. Boiteau

[57] ABSTRACT

An apparatus for measuring the velocity of a contained fluid by the time required for pulses of sound energy to travel upstream and downstream, includes two simultaneously pulsed transducers mounted on the outside of the conduit wall or introduced into the stream of fluid. An electrical circuit is provided for eliminating interference by sound vibrations excited by the transducers in the wall of the conduit and which have equal travel times.

7 Claims, 5 Drawing Figures

ELECTRO-ACOUSTIC FLOWMETER

The present invention relates generally to apparatus or systems for measuring the velocity of fluid in motion, usually, though not necessarily, while the fluid is contained within a conduit. In one respect, the application is directed to non-invasive apparatus for measuring flow velocity but in a simplified version, it may be employed while immersed in the fluid stream, whether or not the stream is fully contained by the conduit. More specifically, the present invention relates to improvements in sonic flowmeters and is an improvement over the disclosure of my co-pending Application for U.S. Letters Patent Ser. No. 103,100 filed Dec. 13, 1979, now U.S. Pat. No. 4,312,238 issued Jan. 26, 1982.

A series of particularly difficult problems is presented in the measurement of the velocity of a stream of fluid, particularly if the stream is fully enclosed by a conduit wall and the technique, for one reason or another, is preferably to be non-invasive, that is, without introducing any part of the apparatus into contact with the fluid. Since there is a multiplicity of applications for non-invasive flowmeters, attempts have already been made to produce a workable broadly applicable non-invasive flow meter. The goal of such prior attempts has been to produce a system which would be applicable with obvious appropriate modifications to a wide range of variables including velocity, conduit material and nature of the fluid whose velocity is to be measured. For instance, efforts have been made to provide a basic system by which the flow of blood could be non-invasively measured within a blood vessel and also the velocity of water or other fluid moving through a steel or other metallic pipe. Such efforts, for a number of reasons have, however, had limited if any utility for their intended purpose. At the same time there are instruments and systems which appear to be readily modifiable for the presently stated purpose but which are not broadly workable.

Among the attempts at solving the problems of measuring the velocity of fluids in a manner which appears to be non-invasively applicable is that disclosed in U.S. Pat. No. 3,575,049, issued Apr. 13, 1971 upon application of Thomas J. Boland. The teaching of this patent is not however, a truly non-invasive deisgn in that two transducers in the Boland disclosure are positioned in a pipe through which the fluid flows and ultasonic energy is coupled directly and continuously through both transducers simultaneously into the fluid. The pipe into which the transducers of Boland are installed is one especially suited to receiving the transducers, their material is not specified nor is the transmission of energy through the walls of the pipe considered in its effect of masking the time and/or phase difference of energy transmitted between the transducers through the fluid. In addition, another factor relating to the material of which the conduit is constructed has been completely by-passed in the Boland disclosure, the effect of temperature and aging upon the spacing between transducers, which in turn affects the phase difference upon which Boland relies for his velocity measurement. A related difficulty in the Boland disclosure is the need to provide a signal in exact quadrature with the transmit signal. The accumulation of shortcomings of the Boland patent result in a greatly narrowed or reduced utility for any practical flowmeter incorporating its teachings.

Unlike the Boland patent, my above-identified application is directed to providing a non-invasive sonic flow meter based upon the transmission of frequency modulated pulses of energy through the wall of a conduit through which a stream of fluid is flowing. Because of the variable effect of interference with the transmission of the required signal between transducers, by energy transmitted through the wall of the conduit, the approach of the pending application has enjoyed limited utility.

It is accordingly an object of the present invention to measure accurately the velocity of fluid flowing through a conduit without the necessity of invading the interior of the conduit with transducers or other parts of the apparatus.

Another object is to accomplish the measurement of flow velocity within a conduit regardless of the material of which the conduit is composed.

A related object is to eliminate the masking effect of sonic energy coupling outside the fluid but through the walls of the conduit between transducers upon the accuracy and reliability of measurements which depend upon the differential propagation time required for passage of the energy through the fluid.

In the achievement of the foregoing objects, a feature of the invention relates to a pair of transducers mounted on the exterior of a conduit in which a fluid stream is contained. The transducers are simultaneously excited and transmit sonic energy into the conduit wall and into the fluid stream. The sonic energy flows in a plurality of modes through the conduit wall but since the wall is isotropic, whether or not homogeneous, the relationship between the pairs of transmitted and received signals, according to the reciprocity theorem, is unaltered by the direction of travel through the wall. However, the moving fluid appears anisotropic because the velocity of the fluid adds to the speed of the sound downstream and subtracts from the speed of sound travelling upstream.

According to another feature of the invention, a modification serves to provide an indication of flow direction when there is a need for directional information which could not be otherwise readily ascertained. Typically, by switching a resistor across one of the two transducers after the transmit pulse, the effect on the amplitude of the received pulses identifies the direction of flow since the weakened pulse is received by the shunted transducer.

The foregoing objects and features of the present invention will be more fully understood and appreciated from the following detailed description of illustrative embodiments taken in connection with the accompanying drawings in which.

Figure 1:
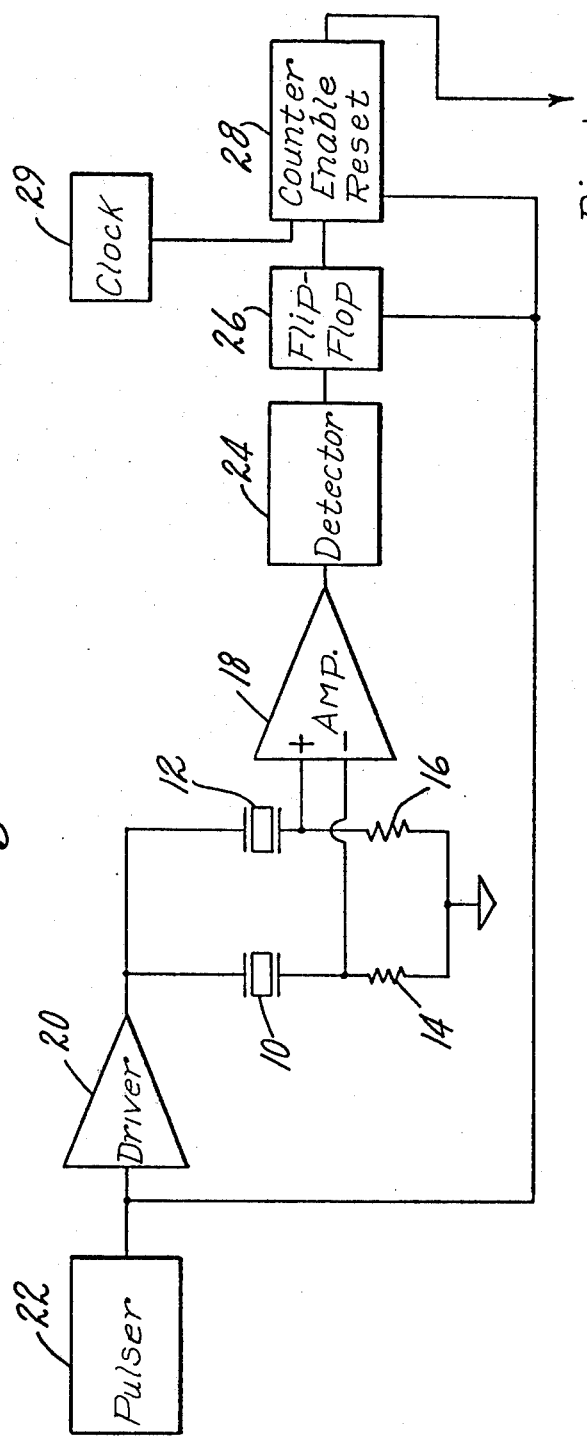
FIG. 1 is a block diagram of a circuit according to the present invention for measuring the velocity of fluid flow inside a conduit.
Figure 5:
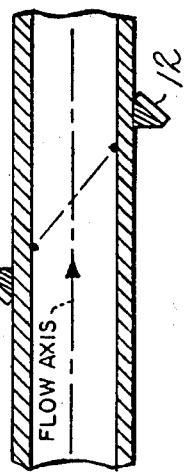
FIG. 5 is a schematic view showing a pair of transducers forming a part of the present invention, each mounted on a wedge on the outside of a conduit.

Turning now to the drawings, there is shown in FIG. 1 a block diagram of a non-invasive circuit according to the present invention including a pair of electro-acoustic transducers 10 and 12 which are preferably in the form of titanate ceramics fitted to an adapter suited to the particular flow intended to be measured by the instrument. Thus, if the instrument is intended for measuring the velocity of blood flowing in an artery or vein by a non-invasive technique, the spacing between the transducers is necessarily limited by the normal shape of the body and the accessibility of blood vessels. On the other hand, if the instrument is to be employed for measuring the velocity of a fluid in a metal pipe of considerable length, the transducers may readily be separately wedge-mounted on the exterior of the pipe, at a predetermined degree of separation in accordance with pre-established criteria, or at any convenient spacing if there is available a basis for calibration against independently observable flow.

The transducers 10 and 12 are connected in a bridge circuit with equal resistances 14 and 16 and an amplifier 18 is inserted into the circuit between the junction of the resistor 14 and the transducer 10 as one side of the input and the junction of the resistor 16 with the transducer 12 as the other side of the input. For energizing the transducers 10 and 12, there is provided a driver 20 which is a power amplifier under the control of a pulser 22. The driver appears as a voltage source, that is, has very low impedance. Typically, the driver 20 receives repetitive gating pulses from the pulser 22 which is either a pulse modulated oscillator or a source of repetitive pulses which, when amplified by the driver 20 and applied to the transducers 10 and 12 causes them to oscillate at a carrier frequency at very close to their natural resonant frequencies.

The transducers 10 and 12 are excited so that sound energy is coupled to the wall of the conduit upon which the transducers are mounted and hence through the wall to the contained fluid. The sound energy travels through the wall of the conduit over various paths and in various modes. However, because the paths through the wall are through an isotropic medium, the relationship of the pairs of transmitted and received wall signals is independent of the direction of travel. The part of the signal which travels through the conduit wall between transducers produces zero differential input to the amplifier 18 because the relationship of the transmitted and received signals is the same in both directions. If the fluid contained within the conduit is moving, however, the flow adds to the speed of the sound downstream and subtracts from the speed of the sound upstream, a fluid in motion representing an anisotropic medium. Therefore, the part of the signals which travels through the fluid in motion produces the only input differential signal to the amplifier 18. The signal received by the transducer 10 is applied to an inverting terminal of the amplifier 18 whereas the signal received by the transducer 12 is applied to a non-inverting terminal, the mode of operation of the two terminals being indicated by minus (−) and plus (+) signs respectively.

Figure 3:
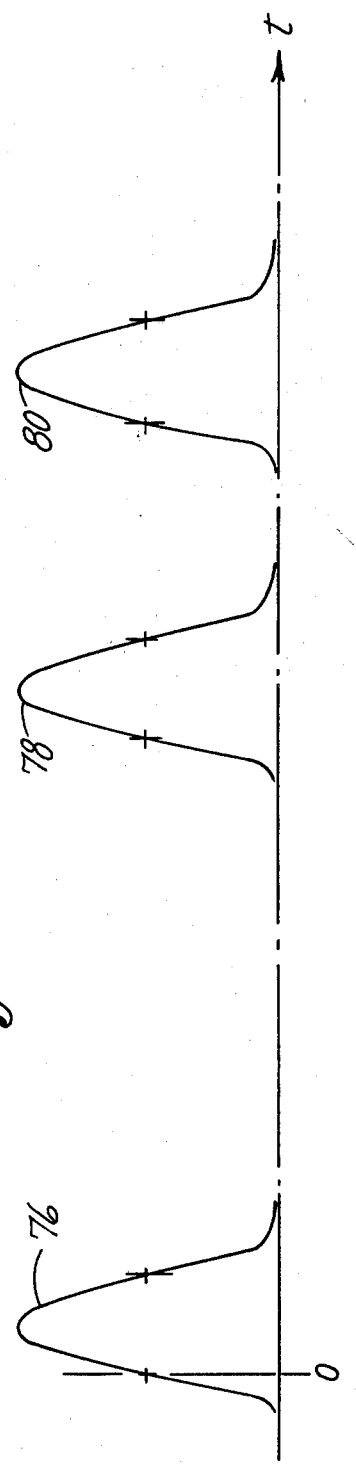
FIGS. 3 and 4 are representations of transmitted and received waveforms occurring under different conditions of relative transducer positioning and sound velocity in particular fluids whose flow velocity is being measured.
Figure 4:
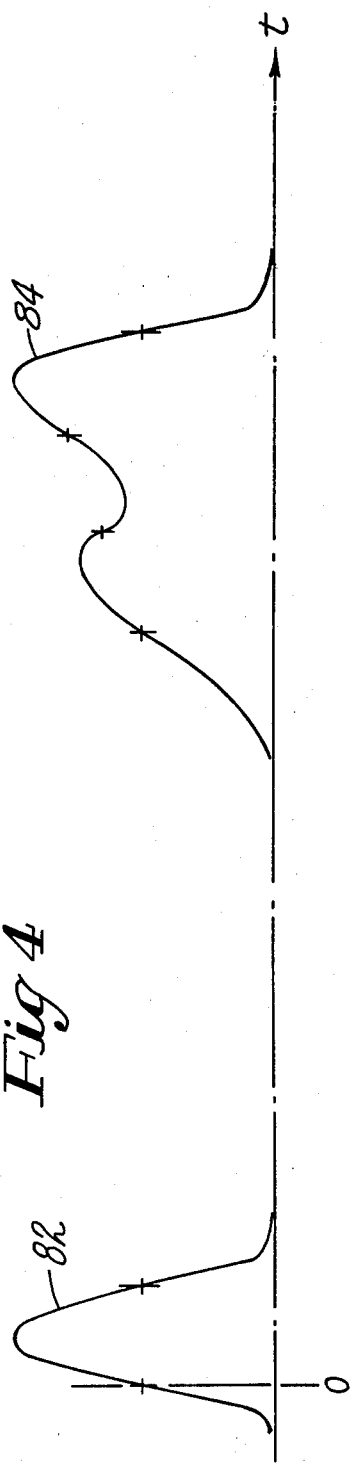

The received signal amplified by the amplifier 18 is fed to a detector 24 whose output is either a pair of separated positive pulses shaped essentially to the contour of the output of the pulser 22 as shown in FIG. 3, or a combined pulse as shown in FIG. 4, both of which will be described in detail below.

The output of the detector 24 is connected to the clock pin of a flip-flop circuit 26, which, in turn, enables a counter circuit 28. Both the flip-flop circuit 26 and the counter circuit 28 are reset by the pulser 22 to which they are connected. With the flip-flop circuit 26 reset, the first received pulse, the one which has travelled downstream, causes the flip-flop circuit to assume the "1" state which, in turn, enables the counter 28 to start counting, being driven by a a clock 29. The second received pulse, that which has travelled upstream between transducers, cause the flip-flop to assume the "0" state and interrupts the count of the counter 28. The total count of the counter 28 which is started by the downstream pulse and terminated by the upstream pulse is thus a direct measurement of the difference in travel times of upstream and downstream travelling pulses and is readily translatable into the velocity of the fluid stream.

Figure 2:
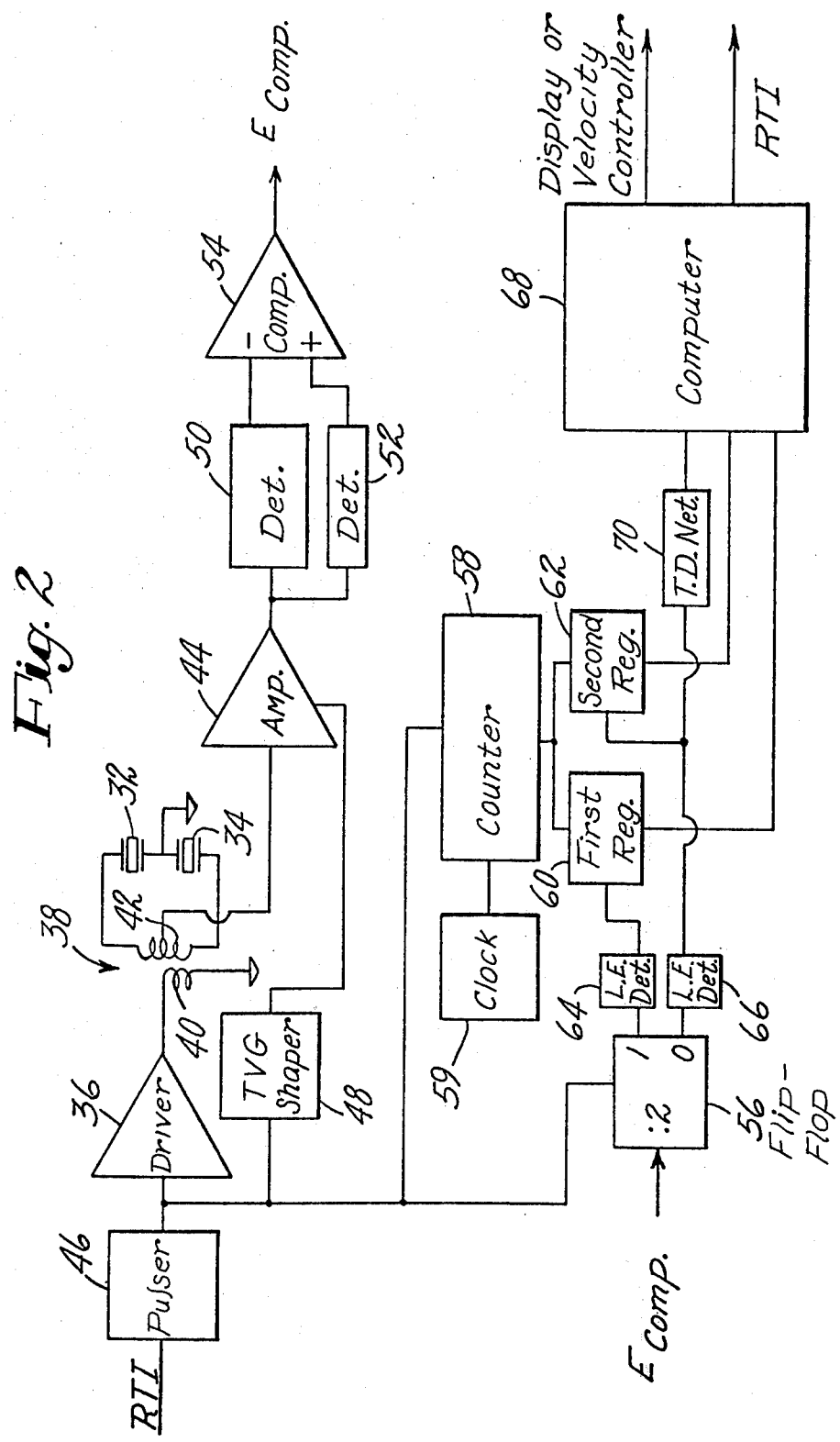
FIG. 2 is a block diagram of an alternative circuit for measuring flow velocity.

There is shown in FIG. 2 an alternative circuit in which transducers are excited through hybrid transformer and a time varying gain controlled amplifier is employed for amplifying the received signals. Included in the circuit are transducers 32 and 34 which may be of the ceramic type as are the transducers 10 and 12. The transducers 32 and 34 are excited by a driver 36 through a hybrid transformer indicated generally at 38 and including primary and secondary windings 40 and 42 respectively. One end of the primary winding is connected to the driver 36 and the other end is grounded. Each end of the secondary winding 42 is connected to one of the transducers 32, 34 and a center tap of the secondary winding is connected to the input port of a high impedance amplifier 44. As in the circuit depicted in FIG. 1, the driver 36 is excited by a pulser 46 which supplies repetitive gating pulses to its input terminal. Also, as in the circuit of FIG. 1, the driver is a power amplifier of low impedance which excites the transducers 32 and 34 to oscillate at or near their resonant frequencies.

The gain of the amplifier 44 is modified by a control signal in such a way that its gain is reduced when the transducers are excited by the driver 36 and increased during the normal period when the signals are received. For this purpose, there is provided a time varying gain (TVG) voltage shaper circuit 48 which is triggered by the pulser 46 when it initiates a pulse to the driver 36. The TVG signal from the shaper circuit 48 is coupled to the control port of the amplifier 44 and controls the gain of the amplifier as a function of time.

The output of the amplifier 44 is fed to a pair of detectors, one designated at 50 being of a short time constant and the other indicated at 52 being a peak detector of longer time constant. The outputs of the two detectors 50 and 52 are combined at the input to a differential comparator circuit 54 which generates a digital signal which clocks a flip flop 56. An additional function of the pulser 46 is that of supplying a clearing pulse to the flip-flop 56 and to a counter 58. Upon being cleared, the counter 58 starts to count being driven by a clock 59 and upon the arrival of the first received signal, the downstream signal, the count representing the time of downstream travel, $T_d$, is strobed into a first register 60. The strobing of the count is effected by the flip flop 56 which causes the register 60 to read when triggered by the part of the received signal which has travelled downstream and is first to arrive at the transducer. The counter 58 continues to count and when the upstream travelling signal, having been processed, reaches the flip flop 56, causes it to assume a "0" state which is coupled to a second register 62, the counter is read into the second register. Pulses from the flip flop 56 are coupled to the register 60 and 62 through leading edge detectors 64 and 66 respectively. At this point, the first register 60 is holding a count equal to $T_d$ and the second register is similarly holding a count equal to $T_u$, the travel time of the upstream signal. The "0" state of the flip flop 56 is also coupled to a computer 68 through a time delay network 70 having a time delay of sufficient duration so that the "0" signal is used to strobe the counts of both the first and second registers 60 and 62 into the computer 64 shortly after the count corresponding to the upstream travel has been strobed into the second register 62.

Shortly after receiving the counts from the registers 60 and 62, the computer 68 generates an RTI signal which triggers the pulser 46 for another operating cycle. In addition, the computer 68 is programmed to compute the velocity of the fluid in accordance with the formula:

$$\frac{V}{C} = \frac{T_u - T_d}{T_u + T_d}$$

in which:
V = fluid velocity ensemble resolved along the axis of the sonic beam.
C = velocity of sound in the stationary fluid.
$T_d$ = time delay between transducers for sound travelling downstream through fluid.
$T_u$ = time delay between transducers for sound travelling upstream through fluid.

In addition to the computation program, there is also stored in the computer memory the appropriate value of C, the velocity of sound in the stationary fluid.

The circuits described thus far are adequate for measuring the speed of a fluid flowing within a conduit but without providing an indication of flow direction. For this purpose, a simple modification of either circuit may be made to provide the direction information when such is desired. The modification consists of a resistor which is momentarily shunted across one of the transducers during the time that it is receiving its signal. The effect of the shunting resistor is to reduce the amplitude of the related received pulse, which may then be recognized by its amplitude during processing. The reduced signal thus identifies the direction of flow in accordance with the timing of its reception. If it is the first to be received, the transducer by which the reduced signal is received is downstream from the other transducer and if received second, the signal is from the upstream transducer.

Turning now to FIG. 3, there are shown waveforms represented on an arbitrary time scale in which zero time, T=0, is established by a 50% value of a transmited pulse 76. A 50% rising value of a first received pulse 78, which has travelled downstream between the transducers, represents either the output of the detector 24 which clocks the flip-flop 26 or the output of the comparator 54 which clocks the flip-flop 56, in either case establishing the time $T_d$, which represents the time required for sound to travel downstream through the fluid between transducers. A 50% rising value of a second received pulse 80 establishes the time $T_u$, the difference between $T_d$ and $T_u$ representing the difference in travel time of sound energy upstream and downstream attributable to fluid velocity.

In addition to the usual condition depicted in FIG. 3, in which received signals are separated in time, there are situations in which the speed of the fluid and/or the spacing of the transducers is so limited that the upstream and downstream travelling signals reach their respective receiving transducers after a transmitted pulse 82 in such a close time relationship that the received signals are partially overlapped, as shown at 84 in FIG. 4. Under these conditions, two different alternative procedures may be employed for determining the velocity of the fluid. One of these is essentially similar to the computation already described for separated signals except that the elapsed downstream travel time is measured to a 50% rising value of detector output, the upstream travel time to the 50% falling value, ignoring times that exceed the earlier time by less than the width of the transmitted pulse. The velocity is then computed by a formula which allows for the pulse width.

A preferable procedure is a correlation method which is readily accomplished by a computer and is based on the fact that for any given fluid velocity, there are characteristic waveforms which may be stored in memory together with related independently measured and known fluid velocities. One such characteristic is the time of zero crossings of the carrier component of received signals which form a sequence characterizing the flow velocity. Another characteristic is the shape of the envelope of the received signal at the output of the detector, which may be digitized and stored in memory. These characteristics can be measured and serve to identify flow velocity even when the received signals consist of a humped pulse shown in FIG. 4, rather than two distinct, separated pulses.

In this version of the instrument, calibration is obtained at known flow velocities by measuring and recording or storing sequences consisting of the times of positive zero crossings or the digitized received signal envelope. The sequence or digitized envelope of an unknown velocity is measured and stored temporarily and matched in the computer against stored sequences, for instance, by comparing correlation coefficients. The largest correlation coefficient then points to the unknown velocity as that of the corresponding "look up" sequence.

From the foregoing description of illustrative embodiments of my invention taken in connection with the accompanying drawings, many alternative forms will be readily apparent to those of ordinary skill in the art. For example, under some conditions which severely limit the proportion of the transmitted pulse which is coupled to the fluid stream, such as containment in a thick-walled conduit, it may be advantageous to provide damping of the tails of transmitting vibrations at the transducers. It is therefore not intended that the drawings and description be taken in a limiting sense but rather that the scope of the invention be interpreted in terms of the appended claims.

Having thus disclosed my invention, what I claim as new and desire to secure by Letters Patent of the United States is:

1. A flowmeter for measuring the velocity of fluid flow in a conduit comprising a pair of transducers mounted in spaced apart relationship in the direction of fluid flow on the exterior of the conduit, each of the transducers being tuned to its resonant frequency near that of the other, excitation means for causing both of the transducers to emit sonic energy intermittently and at the same time through the wall of the conduit and into the fluid, amplifier means for processing upstream and downstream travelling signals received by the transducers including a differential amplifier to which both transducers are connected, whereby signals carried through the isotropic medium of the wall of the conduit simultaneously between the transducers produce zero differential signals at the input of the differential amplifier, counting means controlled by the downstream signal and the upstream signal and means for converting the counts into fluid velocity.

2. A flowmeter according to claim 1 further characterized in that the transducers comprise titanate ceramic elements.

3. A flowmeter according to claim 2 further characterized in that the transducers are wedge mounted on the exterior of the conduit.

4. A flowmeter according to claim 1 further characterized in that the transducers are part of a bridge circuit with a pair of equal resistors and that the junctions of each resistor with a transducer is connected to the input of the differential amplifier.

5. A flowmeter for measuring the velocity of fluid flow in a conduit comprising a pair of transducers mounted in spaced apart relationship in the direction of fluid flow on the exterior of the conduit, each of the transducers being tuned to its resonant frequency near that of the other, excitation means connected to both transducers through a hybrid transformer wound with a center tapped secondary winding for causing both of the transducers to emit sonic energy intermittently and at the same time through the wall of the conduit and into the fluid, amplifier means connected to the center tap for processing upstream and downstream travelling signals received by the transducers, whereby signals carried through the isotropic medium of the wall of the conduit simultaneously between the transducers produce zero differential signals at the input of the amplifier, counting means controlled by the downstream signal and the upstream signal and means for converting the count into fluid velocity.

6. A flowmeter according to claim 5 further characterized in that the means for converting the counts includes separate registers for times of upstream and downstream sound travel.

7. A flowmeter according to claim 6 further comprising a counter connected to the registers, a clock driving the counter, and a flip flop triggered by the downstream and upstream signals to cause the registers to read in from the counter counts equal to the time of upstream and downstream signal travel.

* * * * *